March 2, 1965

F. T. McCLURE 3,172,108

METHOD OF NAVIGATION

Original Filed May 12, 1958

SIMPLIFIED DOPPLER CHARACTERISTICS
EFFECT OF EARTH'S ROTATION

THEORETICAL ULTIMATE ACCURACY

INVENTOR.
FRANK T. McCLURE

March 2, 1965  F. T. McCLURE  3,172,108
METHOD OF NAVIGATION
Original Filed May 12, 1958  5 Sheets-Sheet 2

SATELLITE BLOCK DIAGRAM

INVENTOR.
FRANK T. McCLURE

March 2, 1965

F. T. McCLURE 3,172,108

METHOD OF NAVIGATION

Original Filed May 12, 1958

INVENTOR.
FRANK T. McCLURE

RECEIVING STATION SCHEMATIC

INVENTOR.
FRANK T. McCLURE

March 2, 1965  F. T. McCLURE  3,172,108
METHOD OF NAVIGATION
Original Filed May 12, 1958  5 Sheets-Sheet 5

INVENTOR.
FRANK T. McCLURE

United States Patent Office 3,172,108
Patented Mar. 2, 1965

3,172,108
METHOD OF NAVIGATION
Frank T. McClure, Silver Spring, Md., assignor to the United States of America as represented by the Secretary of the Navy
Continuation of application Ser. No. 736,435, May 12, 1958. This application June 29, 1964, Ser. No. 379,058
12 Claims. (Cl. 343—112)

The present application is a continuation of my application Serial No. 736,435, filed May 12, 1958, now abandoned.

The present invention relates to navigation systems. More particularly, it relates to a method of navigation utilizing an artificially established earth satellite as a reference for determining the location of an observer in terms of latitude and longitude.

Piloting, dead reckoning and celestial navigation are the better established methods of navigation, each having been used for several centuries with continually increasing accuracy. It is evident that dead reckoning alone among these prior methods can be relied upon to fix the position of the observer no matter what weather conditions might prevail. It should also be noted that dead reckoning is perhaps the least accurate of these prior methods due to the fact the course, drift, currents, etc., must be continuously determined with an order of precision at least equal to that desired in the position fix. Radio position finding, a method of more recent origin, yields reasonable accuracy, particularly in the loran method, and moreover possesses the advantage of being free from restriction by weather conditions. However, certain phenomena relating to the propagation of radio waves limit the useful range of the loran method to about 1500 miles.

Recent success in the launching of artificial earth satellites having reasonably long life times has now made possible the practice of the method of navigation which is the subject of the present invention. This method and system have the advantages of being world-wide in useful range and of being useful without regard to weather conditions.

It is an important object of the present invention, therefore, to provide an accurate method of navigation and a system which is operable throughout the world and which is without limitation by weather conditions.

Another object of the present invention is to provide a method of navigation and a system by which the position of an observer can be determined precisely by means acting wholly automatically.

A further object of the present invention is to provide a method of radio navigation and a system which is passive so far as the observer is concerned, as no interrogation signal is required.

An additional object of the present invention is to provide a method of radio navigation and a system which is unlimited in capacity so far as the number of simultaneous observations are concerned.

Still another object of the present invention is to provide a method of radio navigation and a system which requires only an elementary form of antenna at the site of observation, thereby eliminating elaborate interferometric or telescopic antenna arrangements.

Yet another object of the present invention is to provide a method of radio navigation and a system which is reasonably free from deception by accidental or intentional jamming.

Other objects and many of the attendant advantages of this invention will be readily appreciated as the same becomes better understood by reference to the following detailed description when considered in connection with the accompanying drawings, wherein.

Briefly, the present invention comprises the preliminary step of observing from a known location the Doppler shift in the frequency of the signal received from a radio transmitter carried aboard an artificial satellite. This Doppler shift yields information from which the satellite's orbit can be calculated. Alternatively, the satellite's orbit can be determined optically or by various other means of observation. Once the satellite's orbit is known with precision, the parameters describing the orbit are transmitted to the satellite for rebroadcast by the satellite. The observer at an unknown location receives the Doppler signals and the orbital parameters from the satellite. This data is supplied to a computer which computes the satellite track from the orbital parameters, assumes various values for the earth coordinates of an unknown location, and fits a theoretical Doppler signal curve to the actual Doppler signal curve. When the theoretical curve is fitted to the actual curve, the earth coordinates of the unknown location will have been determined with a high degree of precision. Consequently, the position of the observer can readily be determined.

The fact that the Doppler shift caused by relative motion between a source and an observer contains position information is, of course, very well-known. What is not recognized is the fact that information as to the position of an observer can be extracted with a remarkable degree of accuracy in the case of an earth satellite in a known stable orbit. In fact, an accuracy comparable to existing navigation systems is immediately achievable, and appreciable improvements in accuracy are feasible as more knowledge of the earth itself is gained.

Figure 1:
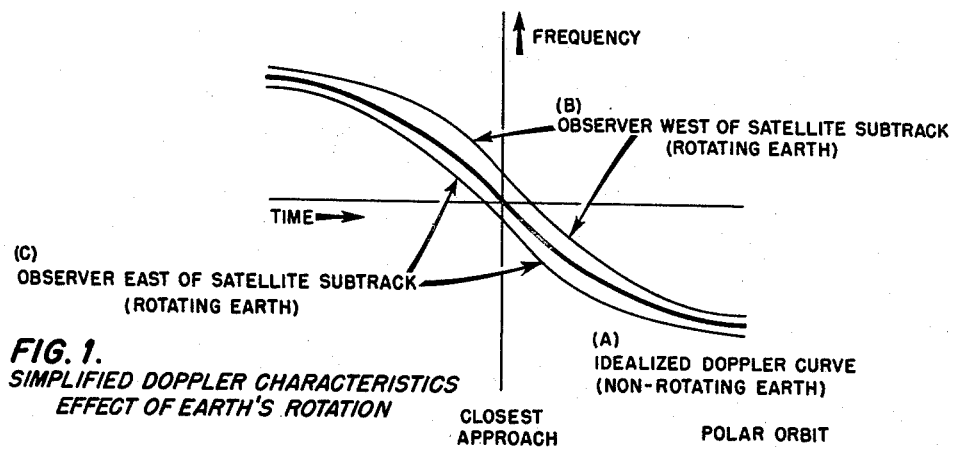
FIG. 1 is a chart illustrating the shift in the observed frequency of the radio signal from a satellite transmitter due to Doppler effects and further illustrating the effect of the rotation of the earth upon the shift in frequency.

In brief illustration of the method, assume that a satellite has been established in a circular orbit passing over the poles at an altitude of 400 miles. Such a satellite has a period of 96 minutes. The satellite contains a stable oscillator and transmitter broadcasting an unmodulated RF signal at 150 megacycles. The observer, say on a ship at sea, listens to the signal transmitted by the satellite during the time the satellite passes over the observer's horizon. Such a pass lasts about 12 minutes. The observer will hear a signal which is initially shifted upward in frequency from 150 megacycles by the Doppler shift due to the rate of the approach of the satellite toward the observer. As the satellite reaches the point of nearest approach to the observer, the Doppler shift becomes zero and the observed frequency will be 150 megacycles. From this point, the frequency will drop still lower and approach the frequency of a purely retreating satellite. The Doppler signal that will be generated has the general characteristics of curve A of FIG. 1. On this curve the point of maximum slope corresponds to the point of the nearest approach of the satellite to the observer. As is well-known, and as has been previously practiced, measurement of the maximum slope reveals the line-of-sight range to the point of nearest approach. Thus, from a point nearer to the satellite track, a more sharply changing Doppler signal would be observed and at a more distant point the Doppler shift would change less rapidly. However, the prior practice of measuring the slope at a single point on the Doppler curve is extremely wasteful of the abundance of information to be gleaned from the Doppler curve. The method of the present invention utilizes many points on the curve and thereby gains vastly increased accuracy, as noted hereinafter.

It would appear that an ambiguity exists in position determination according to the present method, since a point east and a point equidistant west of the orbit might be expected to observe identical Doppler shifts. Indeed, on a stationary earth there would be such an ambiguity. However, the earth's rotation modifies the Doppler signal in a different way for points on opposite sides of the orbit. A point west of the orbit will have an additional component of approaching velocity which will shift the received Doppler frequency upward, as seen in curve B of FIG. 1. On the other hand, for a point east of the orbit the motion of the earth causes corresponding downward shift in frequency, as seen curve in C of FIG. 1. The earth's motion therefore removes the ambiguity in the determination of the observer's position.

It will be understood, however, that the determination of the off-axis distance of a point that is almost directly under the satellite orbit is imprecise because the slant range to the point of nearest approach of the orbit changes very little with variations in the lateral position of the observation point. Thus, for a satellite in a polar orbit, a pass directly overhead is not suitable for use because of inaccuracy in the longitude measurement.

Figure 2:
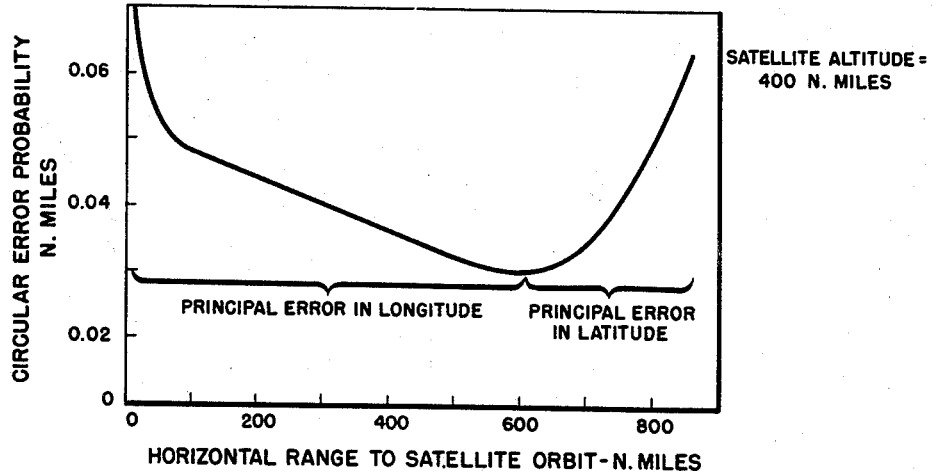
FIG. 2 is a chart illustrating the ultimate theoretical accuracy attainable by means of the present invention.

FIG. 2 illustrates the probable circular error plotted as a function of the horizontal range to the satellite. It will be seen that the observing point need only be displaced some 75 miles from the plane of the orbit to achieve very good accuracy. Therefore the number of satellite passes which will not yield accurate results is small.

Two factors lead to the accuracy which may be achieved in determining position by the present method. The first factor is that frequency (time) is one of the physical variables most readily measured with a very high degree of precision. The second factor, is the fact that there is a tremendous redundancy in the information contained in the shape of the entire Doppler curve. Thus, the position of the observing station can be determined not only by the slope and time of the point of maximum slope, but also by comparing the Doppler levels at two points which correspond, for example, to points 500 miles apart on the satellite trajectory. Therefore, the full Doppler curve obtained during the passage of a satellite can be considered to provide a large number of determinations of location. These determinations are nearly statistically independent. In practice, the equivalent of averaging such a large number of independent determinations is accomplished by using curve-fitting techniques.

It may be questioned, whether the present method provides a sufficient number of fixes to be of practical benefit. A satellite at an altitude of 400 miles is above the horizon for an observer on the earth's surface to a range of about 1600 miles, and any pass of the satellite which brings it within a distance of about 800 miles of the observer will provide a reasonable strength Doppler signal. As the earth turns on its axis, each successive pass of the satellite is displaced about 1600 miles to the west at the equator. Hence, in general, an oberver at any spot on the equator will have one useful pass of the satellite every 12 hours. Thus, a single satellite will provide position data twice a day. If four satellites are established in polar orbits in planes approximately three hours apart, position data is available to an observer anywhere on the earth not less than every three hours. Eight satellites provide position information every hour and a half, etc. The frequency of useful passes improves with increasing latitude, and at the high latitudes every pass of each satellite is within range. However, to provide greater uniformity of service throughout the world, it would be desirable to establish a certain number of satellites in non-polar orbits.

With a number of satellites in orbit it is necessary to provide some means of identifying the particular satellite being observed. Each satellite may conveniently identify itself by transmitting its orbit parameters. The parameters can be transmitted by the satellite as a brief burst of digital information once a minute or so in the form of a pulse modulation of the main oscillator. Such a brief burst of modulation would not interfere with the primary use of the oscillator as a CW source for the generation of Doppler signals.

The tansmission of the orbit parameters by the satellite is a desirable feature. It is not to be expected in the near future that enough will be known about the exact distribution of the upper atmosphere to be able to predict orbits with high precision for a period of months. However, sufficient is presently known that accurate predictions for two revolutions can be made. Carrying the orbit information in the satellite allows the possibility of correcting, or rather updating, this information every three hours or so as the satellite passes over appropriately selected fixed control stations. To prevent accidental or intentional insertion of false data, a security gate can be provided in the satellite to allow reception of information only over the control stations.

Figure 3A:
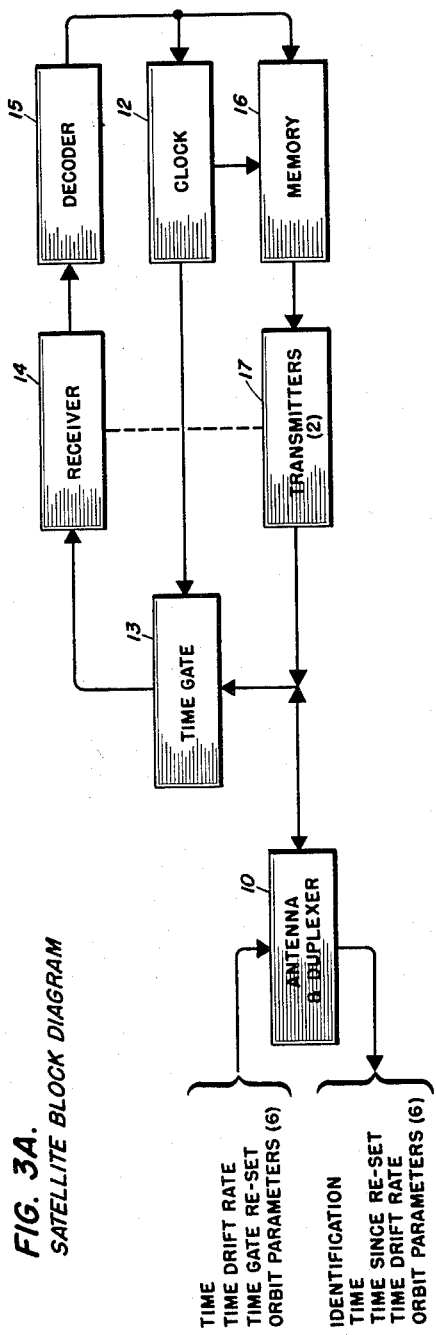
FIG. 3A is a functional block diagram broadly illustrating the apparatus carried aboard the satellite.

FIG. 3A illustrates one arrangement whereby the satellite is enabled to perform the foregoing functions. An antenna 10 of any suitable kind is provided together with a duplexer enabling the same antenna to be used for transmission and reception. A clock 12, later to be described, controls a time gate 13 which connects the antenna 10 to a receiver 14 at such times as the satellite is passing over a control station. The control station then transmits time signals and orbit parameters to the satellite. A decoder 15 connected to the receiver output provides an additional security check to prevent the insertion of false information in the satellite. When the control station commences its message to the satellite with the proper code, the decoder 15 opens to permit the transmission of the balance of the message to the clock 12 and to a memory device 16. Periodically thereafter the clock 12 commands the memory 16 to modulate the output of a transmitter 17 aboard the satellite and thus broadcast the information inserted by the control station throughout the satellite orbit.

Figure 3B:
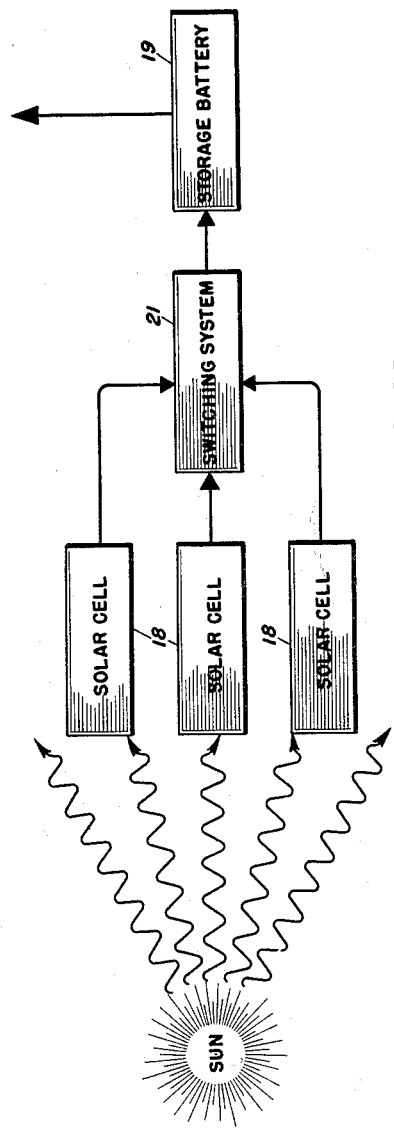
FIG. 3B is a block diagram illustrating the power supply for the satellite.

The satellite power supply is illustrated in FIG. 3B. Solar radiation is converted to electrical energy by solar cells 18 distributed over the exterior of the satellite. When illuminated, the cells 18 supply energy to a storage battery 19 through a switching system 21. The battery 19 then supplies energy to the satellite's electrical apparatus. The switching system 21 disconnects the cells 18 when the satellite is shadowed by the earth. The satellite will continue to function, however, from the energy of the storage battery 19.

Figure 4:
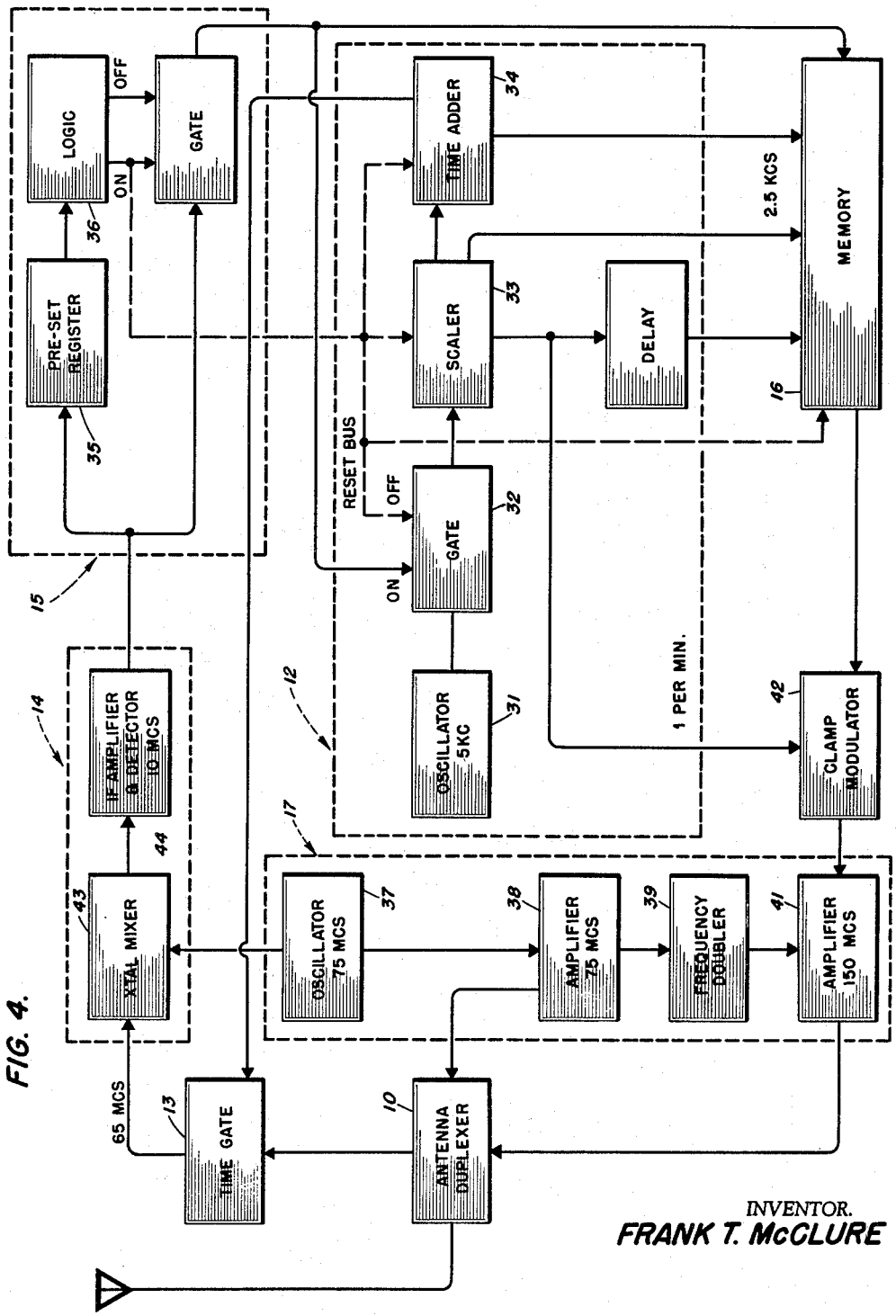
FIG. 4 is a block diagram illustrating in greater detail than FIG. 3A the apparatus carried aboard the satellite.

The satellite instrumentation is illustrated in greater detail in FIG. 4. As indicated in FIG. 3A, a stable clock 12 is used in the satellite to provide a time correction for the observer who will determine his position by means of the satellite. The clock 12 may suitably include a 5 kcs. crystal oscillator 31. The stability required over a 24-hour period is 0.01 second or 50 cycles. This represents an accuracy of one part in $10^7$ for a 24-hour period. Crystal oscillators with temperature control are capable of providing the necessary stability. Pulses from oscillator 31 are fed through a gate 32 into a three-hundred-thousand-to-one scaler 33 to provide an output pulse at one-minute intervals. The first stage of scaler 33 also serves as a frequency divider providing a 2.5 kcs. signal to the memory 16. The output of scaler 33 is fed to a time adder and coder 34. The adder and coder unit 34 accumulates a running total of the number of minutes since the clock has been reset by a control station and encodes this total into a binary word at one minute intervals.

The gate 32 is turned off by a reset pulse transmitted by the control station and turned on after the lapse of a specific time interval. The total is also cleared from the time adder 34 by the reset pulse from the control station.

The decoder 15 includes a preset register 35, into which a certain code number has been entered, and a logic circuit 36. The logic circuit 36 determines whether the proper code number has been transmitted. If so, a decoder gate 37 opens to permit information to be entered in the memory 16 by the control station. After the message has been completed and gate 37 closed, the decoder register 35 can be reset to the same code number or to a new number. If, for reliability, a fixed code is desirable, the register 35 can be replaced by a delay-line and a coincidence circuit as commonly found in many radar applications.

The memory 16 stores the output of decoder 15 for the non-destructive readout occurring at one-minute intervals. The memory 16 may suitably comprise a magnetic drum similar to those commonly used as storage devices in computers. An aerodynamic or magnetic flotation system is preferred in place of bearings for supporting the drum, as the drum friction must be held as low as possible. The drum need not be large, say 0.5 inch in diameter and one-inch long. A rotation speed of 3000 r.p.m. is adequate. The memory 16 may also be suitably comprised by other known storage devices among which are magnetostriction delay lines and magnetic core matrices.

The transmitter 17 comprises a stable crystal oscillator 37 driving an amplifier 38. A frequency doubler 39 receives a portion of the output of amplifier 38, doubles the frequency thereof and drives a second amplifier 49. Two stable RF carriers are thereby derived from oscillator 31'. In addition, oscillator 31' serves as the local oscillator for the receiver 14.

The transmitter of FIG. 4 transmits on two discrete frequencies, rather than on a single frequency, in order to remove the effects of ionospheric refraction from the signal transmission. It is well-known that ionospheric refraction error is an inverse linear function of the transmitted frequency. Thus, the refraction term may be easily eliminated from the Doppler signal algebraically by multiplying (or dividing) the appropriate Doppler signal by the common denominator of the transmitted frequencies and then subtracting the two quantities.

Transmission of orbit parameters and time information is accomplished by pulse modulating the output of amplifier 41. For this purpose a clamp modulator 42 is provided which removes the D.C. voltage from amplifier 41 in accordance with the binary signal output of the memory 16. In the modulator 42, the binary data is converted into pulse-width form; i.e., a binary zero (0) is represented by a 100-microsecond pulse while a binary (1) is represented by a 300-microsecond pulse. Thus, the period is fixed at 400 microseconds and the amplitude of the pulses is also fixed at maximum CW output. The 150 mcs. carrier is therefore merely turned on and off as may be appropriate during the readout period.

The receiver 14 is a superheterodyne employing a balanced crystal mixer 43 followed by a transistorized IF amplifier 44. A portion of the output of transmitter oscillator 31' serves as a frequency conversion signal in mixer 43. The control station may suitably transmit on 65 mcs. and thus the required center frequency for IF amplifier 44 is 10 mcs.

Figure 5:
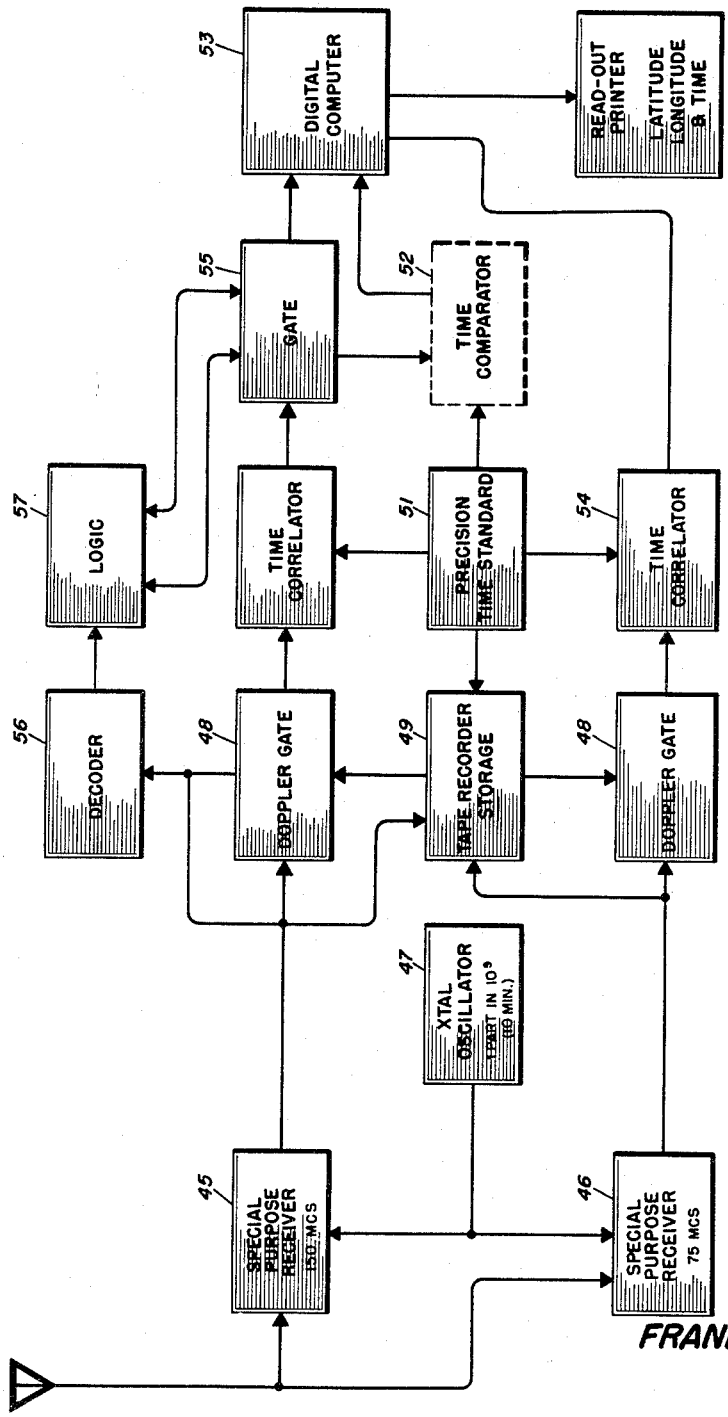
FIG. 5 is a block diagram illustrating the shipboard apparatus employed for navigating by means of the present invention.

FIG. 5 illustrates shipboard apparatus suitable for use in accordance with the method of the present invention.

A pair of receivers 45 and 46 are provided for receiving separately the two CW signals radiated by the satellite. Receivers 45 and 46 include suitable injection circuits which combine the received signals with the output of a relatively stable crystal oscillator 47. A tolerable drift rate can exist in oscillator 47 as a stability requirement of one part in $10^9$ holds only for the duration of the observation period which constitutes about 10 minutes. The combination of the received signal with the output of oscillator 47 yields the audio Doppler signal which is applied to a Doppler gate 48. The Doppler signals are also supplied to a precision tape recorder 49 together with time signals from a precision time standard 51. The Doppler data stored by recorder 49 makes it possible to recalculate the position of the observer in case of a temporary computer malfunction.

The precision time standard 51 provides highly accurate timing signals in order that one mile accuracy may be obtained. The time standard 51 may include a crystal oscillator, similar to the oscillator 31 illustrated in FIG. 4, together with a time comparator 52 providing a correcting means which is responsive to the satellite timing signals. Alternatively, time standard 51 may comprise an atomic clock in which case the need for satellite timing signals is eliminated.

The Doppler gate 48 provides a means for automatically reducing the Doppler signal data to a digital form which may be fed directly to the computer. The gate 48 comprises a plurality of very narrow band width filters suitably spaced in center frequencies to cover the expected frequency range of the Doppler signal. Crystal lattice filters provide good stability over a very long period of time. It is desirable however that the center frequency of these filters be checked periodically in a routine maintenance procedure to eliminate the possibility of error in the reduction of data.

Output devices connected to each of the filters of gate 48 supply to the computer 53 a digital code number of the frequency of the filter responding to the Doppler signal.

Prior to the entry into the digital computer 53 of the code number representing a particular Doppler frequency, the code number is supplied to a time correlator 54 which records the precise time of occurrence of the code number. The time and frequency numbers are then supplied to the computer 53. The shipboard station may, if desired, be provided with a security gate 55 similar to the gate 15 aboard the satellite. The gate 55 is actuated by a decoder 56 and logic circuit 57 in the same manner as the gate 15.

The orbit parameters transmitted by the satellite are the followings:

T—The period of the satellite.
C—The inclination of the orbital plane to the equinoctial.
Ω—The longitude of the ascending node measured from the First point of Aries (♈).
ε—The eccentricity of the orbit ellipse.
$\Phi_\rho$—Argument of perigee.
τ—Time of passage through ascending node.

Figure 6:
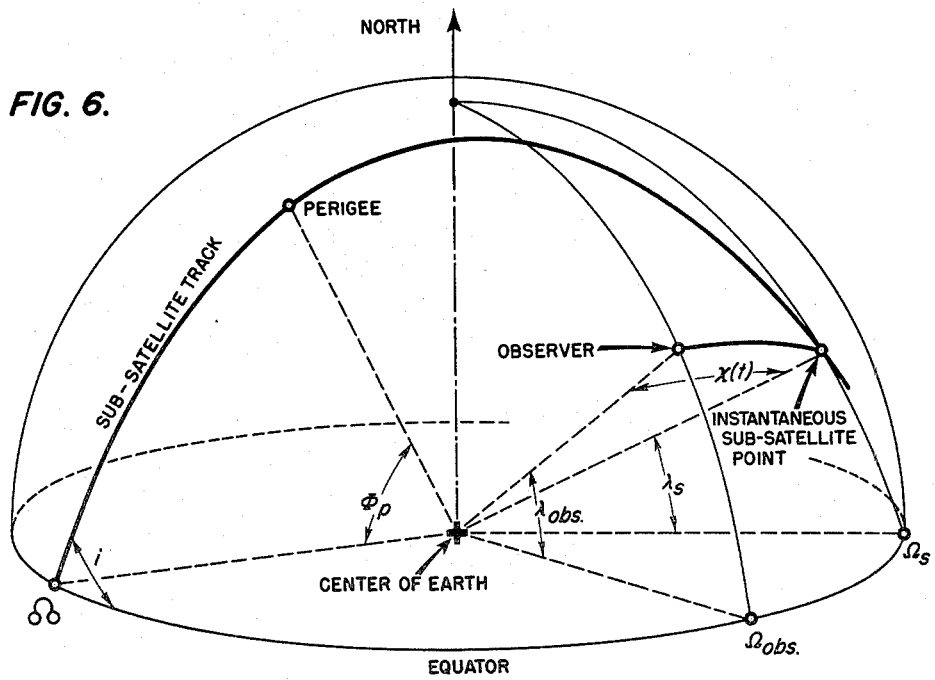
FIG. 6 is a diagram illustrating the parameters of the satellite orbit.

These parameters are illustrated in part in FIG. 6. With knowledge of the orbit parameters, together with the precise time, it is possible to compute the position of the satellite during the observation period. The position of the satellite may be expressed in any desired reference system. For example, the earth coordinates in latitude and longitude of the instantaneous sub-satellite point may be computed as well as the satellite altitude, although these references may not be as convenient as another arbitrary set of references for the balance of the computations. Simultaneously with the determination of the satellite position, the observer, by analysis of the received Doppler signal, determines his position with respect to the satellite and ultimately the earth coordinates of his position.

The analysis of the Doppler data is conducted as follows.

An expression for the Doppler frequency in terms of the change of optical path length is written. Basically, the instantaneous Doppler frequency $f_D$ is given by $$fD = \frac{fo}{c} \frac{d\Lambda}{dt} \quad (1)$$

where $fo$ is the frequency of the satellite oscillator;
$c$ is the velocity of light in vacuo; and
$\Lambda$ is the instantaneous optical path length.

Upon deriving an expression for $\Lambda$, the above formula can be written as $$f_D = \frac{r_e f o}{c} \left[ \sin \beta_o(t) \frac{dx(t)}{dt} + \frac{1}{(t)} \frac{d\rho(t)}{dt} \cdot \sqrt{\rho^2(t) n^2(\rho) - \sin^2 \beta_o(t)} \right] \quad (2)$$

Figure 7:
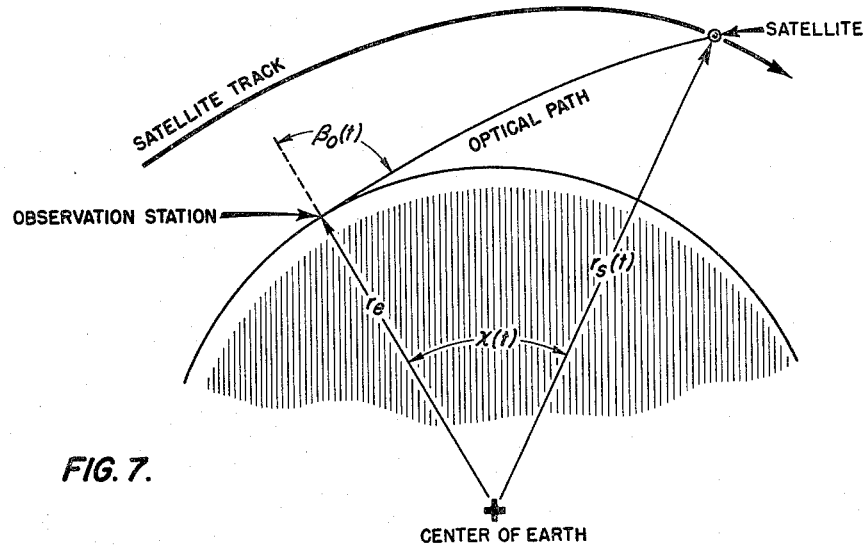
FIG. 7 is a diagram illustrating certain of the variables employed in computing position in accordance with the present invention.

The variables of Equation 2 are defined, with reference to FIG. 7 as follows:

$\beta_o(t)$—Instantaneous angle from zenith at which the radio signal arrives at the observation station;
$\chi(t)$—Angle at the center of the earth between the instantaneous position of the observer and the instantaneous position of the subsatellite point;
$\rho(t)$—The ratio $$\left( \frac{r_s(t)}{r_e} \right)$$

of the radius vector from the center of the earth to the instantaneous position of the satellite ($r_s(t)$) to the radius of the earth at the position of the observer ($r_e$); and $n(\rho)$—The index of refraction at the satellite position.

At ultra high frequencies (1000 mcs.), the refractive effects represented by $n(\rho)$ become almost negligible and satellite transmission should be conducted on ultra high frequencies if otherwise practicable. If for other reasons, it is necessary to operate at VHF frequencies near 100 megacycles, refractive effects must be considered.

When refractive effects are sufficiently small to be of second order, the expression for the Doppler shift can be approximated by the form:

$$\frac{f_{(D)}}{f} = f_D{}^{(0)} + \frac{f_D{}^{(1)}}{f}$$

where $f_D$ = Doppler frequency shift
$f_D{}^{(0)}$ = Doppler frequency shift with no refraction
$f_D{}^{(1)}$ = Correction term dependent on refraction
$f$ = Transmitter frequency By the use of two frequencies, say 75 and 150 mcs., the refraction dependent terms, $f_D{}^{(1)}(t)$ can be eliminated algebraically, and the results fitted to the appropriate experimental members. Therefore, it is recommended that if satellite transmission is to be conducted at very high frequencies, transmission should be made on two separated very high frequency channels.

The fact that the change in the shape of the Doppler curve is not the same change as would result from a change in the position of the observer permits of still another method of correcting for refractive errors. Therefore, by the utilization of curve fitting techniques similar to those employed in computing the position of the observer, the refractive effects can be accounted for. $\chi(t)$ obviously is a function of the latitude and longitude of the observer and the latitude and longitude of the instantaneous sub-satellite point. No explicit expression has been set forth for the latitude and longitude of the observer, as it is clear that it is a relatively straightforward problem in spherical trigonometry to write $\chi(t)$ in these terms. Furthermore the choice of a coordinate system rests largely upon the program designed for the computer 53.

In determining the position of the observer, the computer 53 performs a curve fitting operation. This technique has the advantage of nearly total use of the data and thereby provides results far more accurate than could be obtained from a single data point. There are many known processes for fitting curves to experimental data points. To mention but a few, there are the Method of Least Squares, the Method of Moments, and the Method of Steepest Descents. Experienced mathematicians will add other methods of their choice to the list. It will be understood that the following example of the operations performed by the computer 53 may be varied widely so as to suit the individual capabilities of the computer or to provide for a more efficient computation process. In general terms, therefore, the operations performed by the computer 53 are these.

Equations of the orbital motion of the satellite, together with the parameters transmitted by the satellite, are entered into the computer 53. Equation 2, varied in form as may be convenient to the operation of the computer, plus the Doppler frequencies and the precise time of the reception of the Doppler signals are also supplied to the computer. For one particular Doppler frequency, the computer determines the position of the satellite at the instant that signal was received, assumes a value for the observer's latitude and longitude and calculates the Doppler frequency which would be received at the assumed position. The calculated Doppler frequency is then compared to the received Doppler frequency and the difference therebetween noted. The computer then assumes a new value for the observer's position, performs the same calculation and determines whether the difference between the computed Doppler frequency and the received Doppler frequency has increased or decreased. The computer iterates these operations until the difference between the computed Doppler frequency and the actual Doppler frequency is minimized. The computer then considers the next Doppler frequency received and so on until all the Doppler data has been digested. Finally the computer performs a statistical operation to determine the most probable position of the observer in view of the results from the preceding operations. The result of this last operation is then printed out as the position of the observer.

In addition to the flexibility in the choice of the method of fitting the Doppler curve data, the versatility of present-day computers permits considerable variation in the program of their operations. Therefore, the computations are not necessarily performed in the order or in the manner herein indicated. It will be further understood that the speed with which computers operate permits, say thirty iterations each for, say twenty-five Doppler frequencies to provide a fix within three to four minutes.

Obviously, many modifications and variations of the present invention are possible in the light of the above teachings. It is therefore to be understood that within the scope of the appended claims the invention may be practiced otherwise than as specifically described.

What is claimed is:

1. A navigation system, comprising,
   an artificial earth satellite travelling in an orbit of known parameters,
   a radio transmitter located aboard said satellite for broadcasting Doppler signals,
   means at an unknown location for receiving at predetermined times said Doppler signals,
   a computing device at said unknown location, and
   means for inserting into said computing device said Doppler signals, said orbital parameters and the time of reception of said signals,
   said computing device being programmed to compute the geographic coordinates of the unknown location by an analysis of said received Doppler signals, the orbital parameters of the satellite and the time of reception of said Doppler signals.

2. The navigation system of claim 1, in which said computing device includes means for deriving a plurality of theoretical Doppler signals which would be received at successively assumed locations, means for comparing said theoretical signals and said received signals and establishing the errors therebetween, and means for iterating the establishment of errors for said successively assumed locations until minimum errors between said theoretical and said received Doppler signals result.

3. The navigation system claim 1, in which said computing device includes means for deriving a theoretical Doppler curve which would be received at successively assumed location, and means for successively fitting said theoretical Doppler curve to the curve of Doppler signals actually received until an assumed location resulting in minimum error is produced.

4. A navigation system comprising, an artificial earth satellite travelling in an orbit of known parameters, transmitting means aboard said satellite for broadcasting Doppler signals on different frequencies, means at an unknown location for receiving and combining said Doppler signals thereby deriving corrected Doppler signals free from the effects of ionospheric refraction, a computing device at said unknown location, and means for inserting into said computing device said corrected Doppler signals, said orbital parameters and the time of reception of said Doppler signals, said computing device being programmed to compute the geographic coordinates of the unknown location by an analysis of the information inserted therein.

5. In the art of radio navigation, the method of locating the position of an observer, comprising establishing in an orbit of known parameters an artificial earth satellite having a transmitter aboard for transmitting Doppler signals, receiving at an unknown location said Doppler signals, inserting into a computer said Doppler signals, the parameters of the orbit and the time of reception of said signals, said computer being programmed to derive a plurality of theoretical Doppler signals which would be received at successively assumed locations during the time of reception of said received signals, storing in said computer the difference between said theoretical signals and said received signals, ceasing the derivation of said theoretical signals at an assumed location which provides the minimum difference between the theoretical and the received signals, and retrieving from said computer the geographic coordinates of the assumed location providing said minimum difference.

6. In the art of radio navigation, the method of locating the position of an observer, comprising establishing in an orbit of known parameters an artificial earth satellite having a transmitter aboard, said transmitter broadcasting Doppler signals on two frequencies, receiving at an unknown location said Doppler signals, combining said Doppler signals thereby producing a third set of Doppler signals free from ionospheric refraction, Inserting into a computing device said third set of signals, the parameters of the orbit and the time of reception of said Doppler signals, said computing device being programmed to derive a plurality of theoretical Doppler signals which would be received at successively assumed locations during the time of reception of said received signals, storing in said computing device the difference between said theoretical signals and said received signals, ceasing the derivation in said device of said theoretical signals at an assumed location which provides the minimum difference between said theoretical and said received signals, and retrieving from said device the geographic coordinates of the assumed location providing said minimum difference.

7. A navigation system comprising, an artificial earth satellite established in orbit, a radio transmitter thereaboard, a first computing device at a known location, said computing device receiving Doppler signals from said transmitter and computing the orbital parameters of satellite, receiving means at an unknown location for receiving the Doppler signals from said satellite and said orbital parameters from said first computing device, a second computing device at said unknown location, and means for inserting into said second computing device said Doppler signals received at the unknown location, said orbital parameters and the time of reception of the Doppler signals, said computing device being programmed to compute by curve fitting methods the geographic coordinates of the unknown location from an analysis of the information inserted therein.

8. The navigation system of claim 7, further including a receiver aboard said satellite, and means at said known location for transmitting the computed orbital parameters to the receiver aboard said satellite for subsequent retransmission to the unknown location.

9. The navigation system of claim 8, further including a memory device aboard said satellite for storing said orbital parameters, and clock means for reading out said memory during the time period when said satellite is within line-of-sight range of said unknown location.

10. A navigation system comprising, an artifical earth satellite established in orbit and having a radio transmitter and receiver thereaboard, a first computing device at a known location for receiving the Doppler signals from said transmitter and computing the orbital parameters of said satellite, means at said known location for transmitting said orbital parameters to said satellite receiver for subsequent retransmission from said satellite, a second receiver at an unknown location for receiving said Doppler signals and said orbital parameters from said satellite transmitter, a second computing device at the unknown location, and means for inserting said Doppler signals, said orbital parameters and the time of reception of said signals into said second computing device, said second computing device being programmed to determine by curve fitting methods the geographic coordinates of the unknown location from an analysis of the information inserted therein.

11. A navigation system comprising, an artificial earth satellite established in orbit and having a transmitter and a receiver aboard, said satellite transmitter transmitting radio signals on two frequencies, a receiver at a known location for extracting and combining said two frequencies to provide a signal free from the effects of ionospheric refraction, a first computing device at a known location for receiving said refraction free signal and calculating the orbital parameters of said satellite, a transmitter at said known location for transmitting said orbital parameters to said satellite receiver for subsequent retransmission, a receiver at an unknown location for receiving the two Doppler signals and said orbital parameters from the satellite, said receiver combining the two said signals to provide a Doppler signal free from effects of ionospheric refraction, a second computing device at the unknown location, means for inserting into the second computing device said refraction free signal, said orbital parameters and the time of reception of the signals, said second computing device being programmed to determine by curve fitting methods the geographic coordinates of said unknown location, and means for retrieving said geographic coordinates from said second computing device.

12. In the art of radio navigation, the method of locating the position of an observer comprising, establishing in orbit an artificial earth satellite having a radio transmitter and receiver aboard, receiving at a known location the Doppler signals broadcast from said satellite transmitter, inserting said received signals into a first computer at said known location to calculate the orbital parameters of said satellite, transmitting said orbital parameters to said satellite receiver for subsequent retransmission, receiving at an unknown location said Doppler signals said orbital parameters from said satellite transmitter, inserting into a second computer at said unknown location said Doppler signals, said orbital parameters and the time of reception of said signals, said second computer being programmed to derive a plurality of theoretical Doppler signals which would be received at successively assumed locations during the time of reception of said signals at said unknown location, storing in said second computer the difference between the theoretical Doppler signals and the actually received signals, ceasing the derivation in said computer of said theoretical signals at an assumed location which provides the minimum difference between the theoretical and the received signals, and retrieving from said second computer the geographic coordinates of the assumed location providing said minimum difference.

References Cited by the Examiner

UNITED STATES PATENTS 3,141,167    7/64    Sandretto _____ 343—100

OTHER REFERENCES

Proceedings of the IRE, vol. 48, No. 4, April 1960, pp. 507–516.

CHESTER L. JUSTUS, *Primary Examiner.*

KATHLEEN H. CLAFFY, *Examiner.*